United States Patent [19]

Sam et al.

[11] Patent Number: 5,676,235
[45] Date of Patent: Oct. 14, 1997

[54] LINEAR PALLET STOP

[75] Inventors: Ronald J. Sam, McFarland; Michael G. Brosier, Beloit; Wayne Walker, Ft. Atkinson, all of Wis.

[73] Assignee: Giddings & Lewis, Inc., Fond du Lac, Wis.

[21] Appl. No.: 526,168

[22] Filed: Sep. 11, 1995

[51] Int. Cl.⁶ .................................................. B65G 21/20
[52] U.S. Cl. ......................... 198/345.3; 193/35 A
[58] Field of Search ........................... 198/345.1, 345.3, 198/633; 193/35 A

[56] References Cited

U.S. PATENT DOCUMENTS

| | | | |
|---|---|---|---|
| 3,811,548 | 5/1974 | Neff | 198/345.3 |
| 4,850,470 | 7/1989 | Ferkany | 198/345.3 |
| 4,947,980 | 8/1990 | Helmstetter | 198/345.3 |
| 5,168,976 | 12/1992 | Kettelson | 198/345.3 |
| 5,211,276 | 5/1993 | Clopton | 198/345.3 |

Primary Examiner—James R. Bidwell
Attorney, Agent, or Firm—Foley & Lardner

[57] ABSTRACT

A linear pallet stop smoothly decelerates a heavy pallet propelled by a conveyance system in a downstream direction and stops the pallet at a predetermined location. The linear pallet stop comprises a catch arm that is translatable and rotatable between three positions. At the first position, the catch arm first end is in the pallets path to be contacted by the pallet and translated in the downstream direction by the pallet momentum. The downstream translation is resisted by a fluid circuit acting through a cylinder and a slide that is in support contact with the catch arm. A stop surface on the catch arm strikes a fixed surface on the conveyance system at a second position of the catch arm. By retracting the slide with the fluid cylinder when the catch arm is in its second position, the catch arm rotates to a third position whereat its first end is out of the pallets path. The catch arm is guided for translation and location by cam followers that are captured within slots in housings. After the pallet has been propelled further downstream, the cylinder is operated to extend the slide and push the catch arm in the upstream direction and return it to its first position.

20 Claims, 4 Drawing Sheets

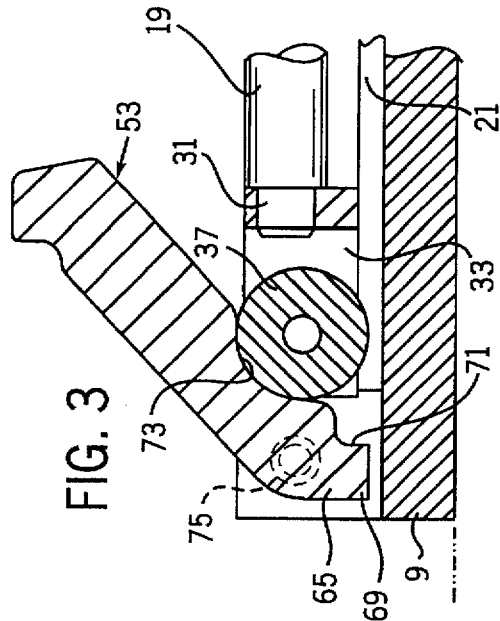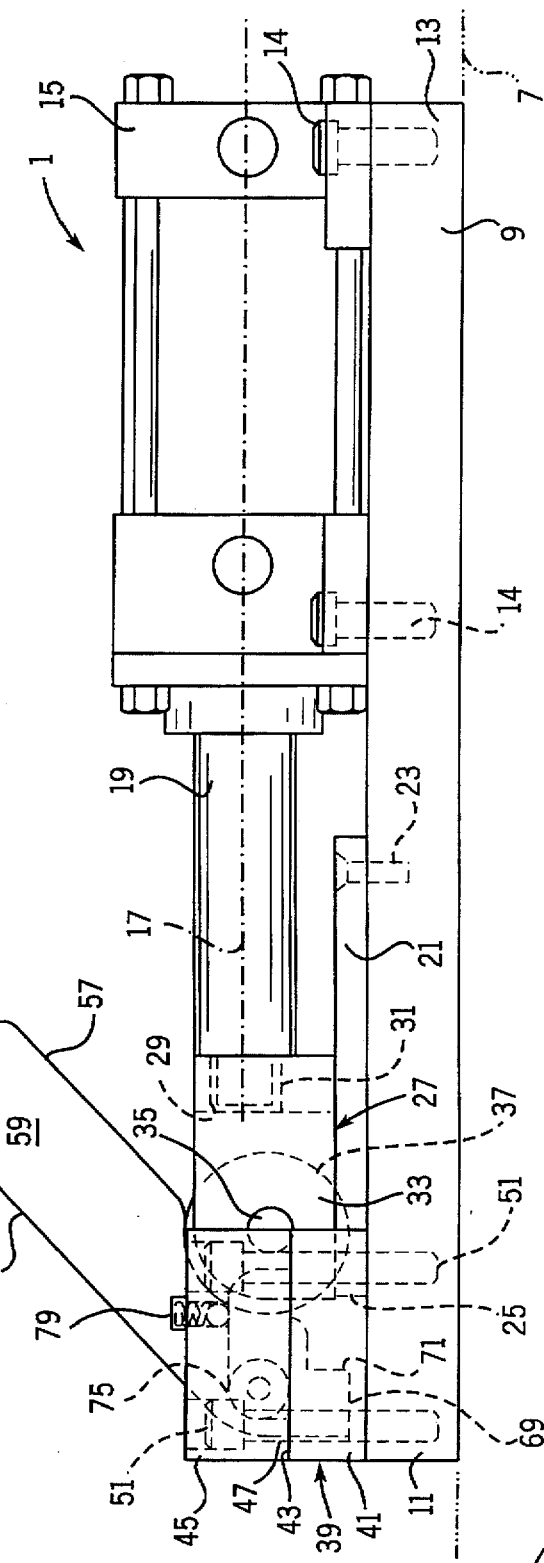

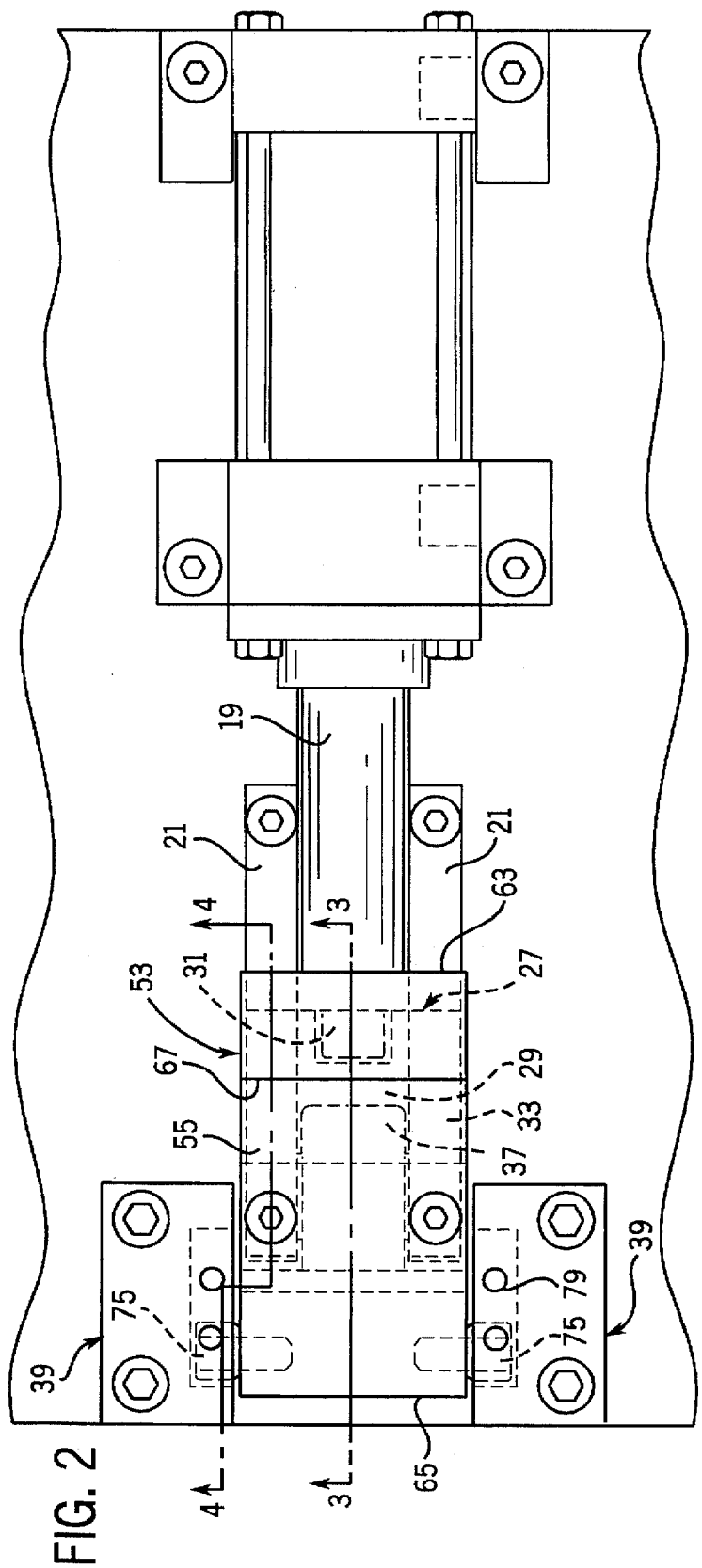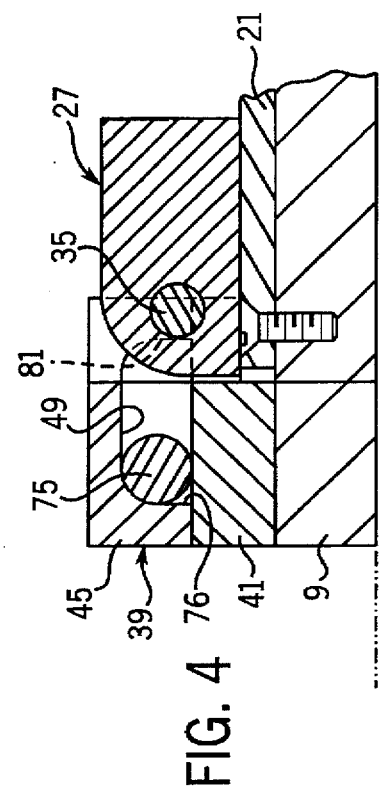

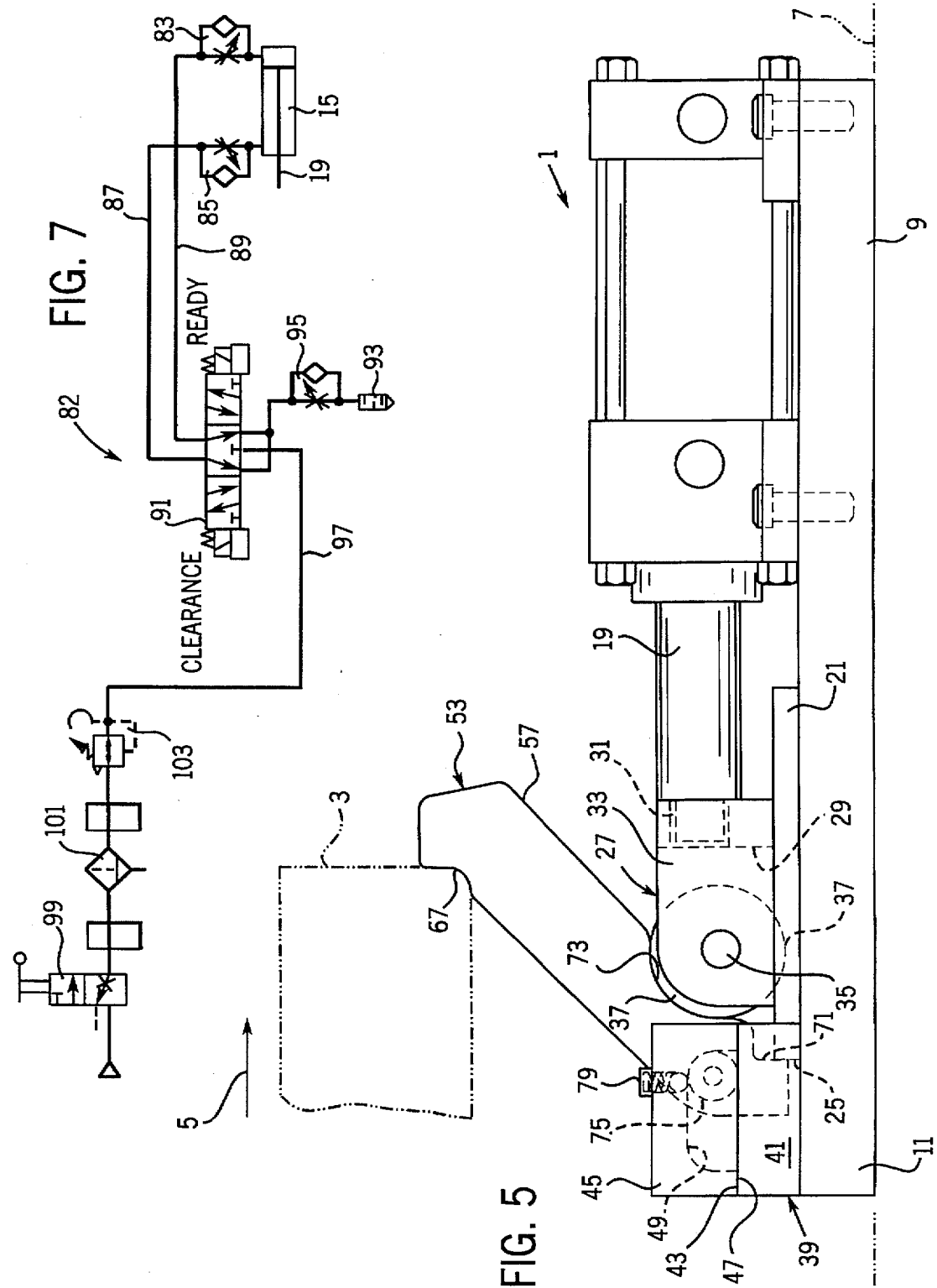

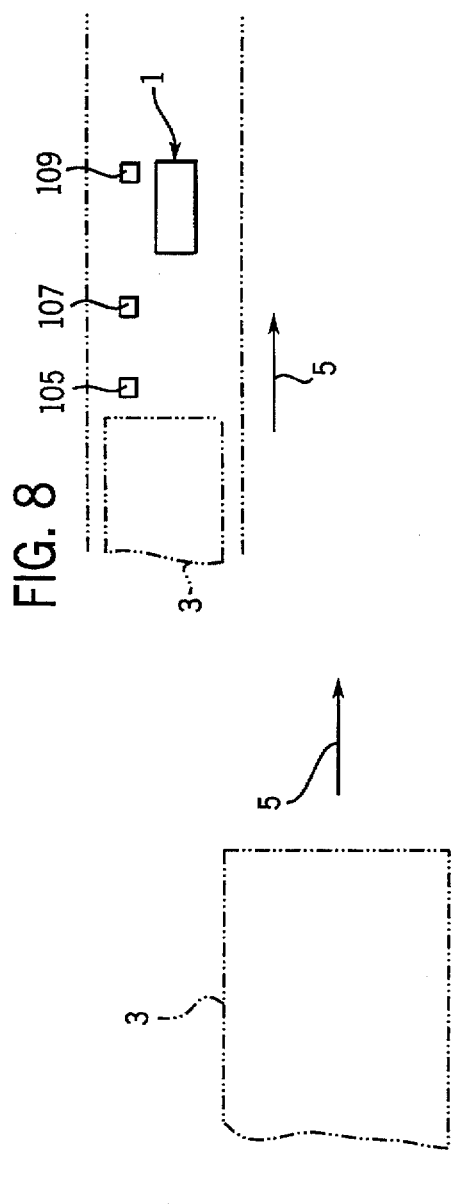
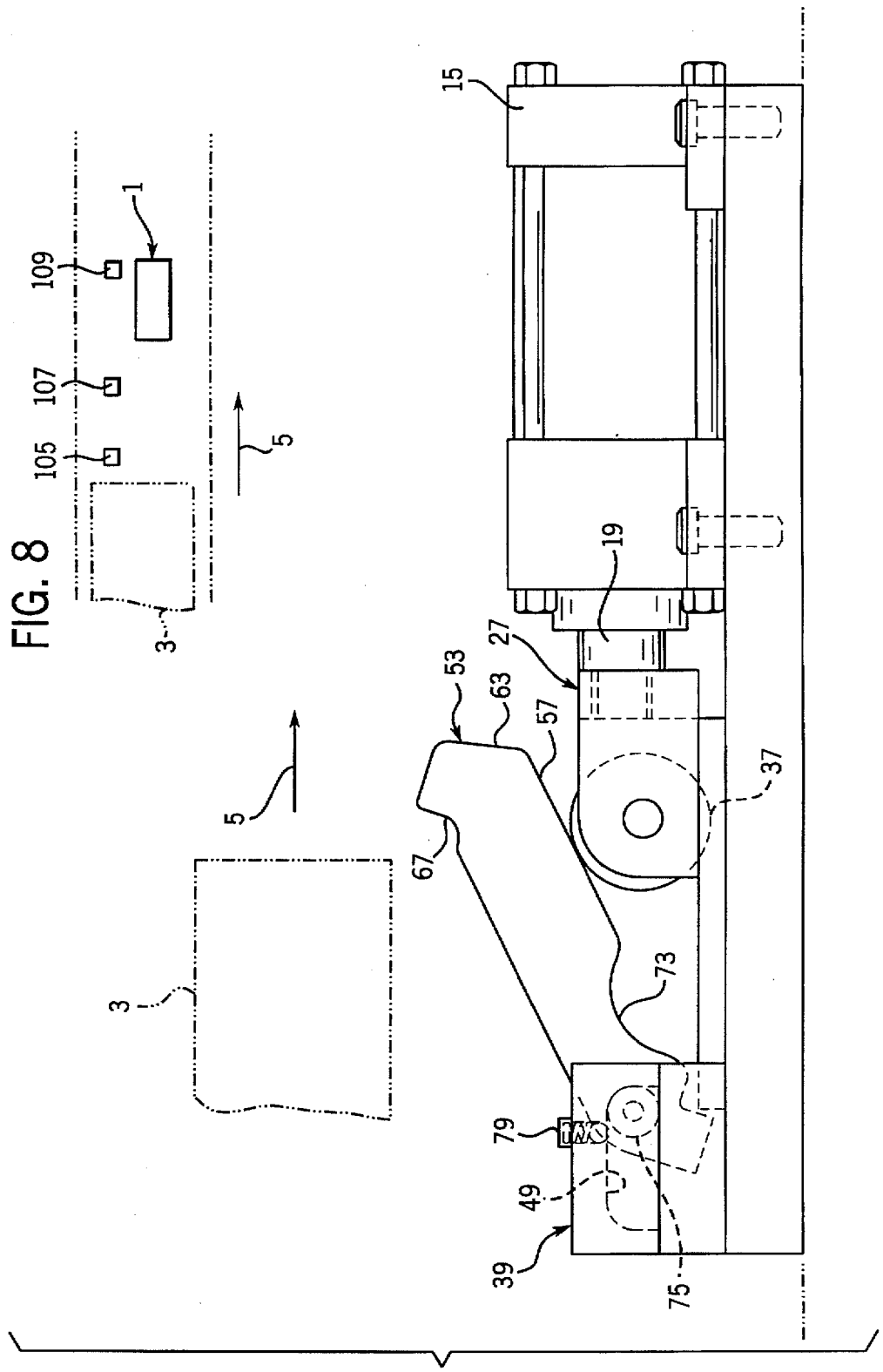
FIG. 8
FIG. 6

LINEAR PALLET STOP

BACKGROUND OF THE INVENTION

1. Field of the Invention

This invention pertains to motion control, and more particularly to apparatus for smoothly decelerating heavy moving objects.

2. Description of the Prior Art

It is well known to propel workpieces between different work stations as part of a manufacturing process. In many instances, the workpieces are secured to pallets. The pallets are supported and propelled in a downstream direction by a suitable conveyance system. Typically, the conveyance system is controlled to alternately propel the pallets between work stations and to hold them stationary for appropriate times at the various work stations.

Pallet conveyance systems present difficult design challenges. A conveyance system must be carefully designed such that it accurately locates a pallet at the work stations. In addition, the conveyance system must satisfy the opposite requirement of rapidly decelerating a moving pallet in order to minimize transfer time between work stations. Another requirement is that the pallet must not bounce back in the upstream direction after its motion in the downstream direction has been arrested.

Solving the problems of stopping a pallet at a carefully controlled location after a minimum deceleration time is especially difficult when the pallets and workpieces have large masses. In some applications, a pallet and its workpiece can weigh several thousand pounds, so severe strains are placed on the conveyance system.

Various types of pallet decelerating and stopping mechanisms have been developed over the years, but their design is still evolving. A typical method of decelerating a heavy pallet is to snub its motion with a hydraulic shock absorber. However, in addition to the shock absorber itself, the prior snubbing mechanisms must also include various operating and mounting components. Some snubbing mechanisms are quite elaborate, combining both rotational and linear motions between the pallet and the shock absorber. The result is that the shock absorber type of snubbing mechanism is undesirably expensive. In addition, hydraulic shock absorbers themselves are troublesome pieces of equipment to keep functioning properly; that is, they require excessive maintenance.

U.S. Pat. No. 5,168,976 shows a cushioned stop for a powered conveyor that utilizes a hydraulic shock absorber and that contains a large number of parts. Another drawback of the stop of the 5,168,976 patent is that it depends upon spring action of questionable reliability to place it in a position ready to be contacted by and decelerate a moving pallet.

Thus, a need exists for continued development of pallet conveyance systems.

SUMMARY OF THE INVENTION

In accordance with the present invention, a simple and inexpensive linear pallet stop is provided that rapidly decelerates and accurately stops a moving pallet at a desired location. This is accomplished by apparatus that includes a catch arm that linearly transfers the momentum of the pallet to a fluid cylinder.

The fluid cylinder is fastened to a frame member of a conveyance system that propels the pallet in a downstream direction. The rod end of the fluid cylinder points in the upstream direction. To the end of the cylinder rod is connected a slide. The slide is supported for reciprocation on ways also fastened to the conveyance system frame. The upstream ends of the ways are accurately located at a predetermined location relative to the conveyance system. Rotationally mounted in the slide is a slide bearing, the outer diameter of which projects above the slide and beyond its upstream end.

The catch arm is located upstream and in longitudinal alignment with the fluid cylinder. The catch arm is fabricated as a sturdy bar having first and second ends. The first end is formed with a hook. Assembled to and projecting oppositely from the catch arm near its second end are a pair of cam followers. The two cam followers are captured and roll within slots in associated housings that are mounted to the conveyance system frame. The housing slots guide the cam followers to enable the catch arm to translate in directions parallel to the motion of the pallet. The cam followers also enable the catch arm to rotate relative to the housings. The catch arm is supported against rotation about the cam followers by the slide bearing. The catch arm is fabricated with a concave arcuate surface near its second end. The arcuate surface has a radius equal to the outer radius of the slide bearing. The catch arm further has a stop surface on its second end.

The housings are mounted to the conveyance system frame in a carefully controlled location relative to the ways. The relation between the ways and the housings is such that when the fluid cylinder rod is extended, the slide bearing is in contact with the catch arm arcuate surface, and the cam followers are at the upstream ends of the slots in their respective housings. In that situation, the catch arm hook is approximately vertical and above the slide bearing and is in the path of the pallet. The catch arm is maintained in that attitude by the coaction of the cam followers with the housing slots and by the support of the catch arm arcuate surface by the slider bearing. The linear pallet stop is then said to be in the ready position.

In operation, an pallet propelled downstream by the conveyance system contacts the catch armhook. Reaction forces provided by the housings acting on the cam followers and by the slider bearing acting on the catch arm arcuate surface prevent rotation of the catch arm about the cam followers. Instead, the catch arm translates downstream, together with the slide, slide bearing, and fluid cylinder rod, under the momentum of the pallet. The rod forces fluid from the cylinder in a controlled fashion through a circuit in a manner that smoothly but rapidly decelerates the pallet. The fluid cylinder circuit is designed to decelerate the pallet such that the stop surface of the catch arm gently strikes the upstream ends of the ways and brings the pallet to a stop without bouncing back. At that point, the cam followers are close to the downstream ends of the housing slots, and the linear pallet stop is in a stopped position. Additional retraction stroke of the fluid cylinder rod remains when the linear pallet stop is in its stopped position. The pallet remains at its stopped location against any attempts by the conveyance system to propel it further in the downstream direction as long as the linear pallet stop remains at its stopped position.

When it is desired to release the pallet for further downstream travel, the fluid cylinder circuit actuates to further retract the fluid cylinder rod. That action causes the slide and the slider bearing to move in the downstream direction. The stop surface of the catch arm, which is already in contact with the upstream ends of the ways, prevents the catch arm second end from translating downstream. Consequently, the slide bearing pulls out of contact with the catch arm arcuate surface and causes the catch arm to rotate by gravity about the cam followers but with the catch arm remaining supported by the slide bearing. As the cylinder rod continues to retract, the slide bearing rolls further along the catch arm toward its first end, and the catch arm continues to rotate. The catch arm eventually attains a position such that the hook is under the path of the pallet. The linear pallet stop is then in a clearance position, and the conveyance system can propel the pallet downstream over the catch arm.

To reset the linear pallet stop to the ready position, the fluid cylinder operates to fully extend the rod. That action causes the slide bearing to roll along the catch arm toward its second end and simultaneously tends to push the catch arm upstream until the cam followers accost the upstream ends of the housing slots. Continued extension of the fluid cylinder rod causes further rotation of the catch arm until its hook is again in the pallet path and the slide bearing regains full contact with the catch arm arcuate surface. At that point, the linear pallet stop is in the ready position to decelerate and stop the next pallet.

The method and apparatus of the invention, using a fluid cylinder and slide operable to three positions, thus smoothly decelerates and accurately stops a moving pallet. The fluid cylinder controls both the decelerating force and the position of the catch arm to positions that selectively prevent and enable downstream motion of the pallet.

Other advantages, benefits, and features of the present invention will become apparent to those skilled in the art upon reading the detailed description of the invention.

BRIEF DESCRIPTION OF THE DRAWINGS

FIG. 1 is a side view of a preferred embodiment of the present invention showing the linear pallet stop in the ready position.

FIG. 2 is a top view of FIG. 1.

FIG. 3 is a cross sectional view taken generally along line 3—3 of FIG. 2.

FIG. 4 is a cross sectional view taken generally along line 4—4 of FIG. 2.

FIG. 5 is a view similar to FIG. 1, but showing the linear pallet stop at the stopped position after having decelerated and stopped a linearly moving pallet.

FIG. 6 is a side view showing the linear pallet stop in a clearance position.

FIG. 7 is a schematic diagram of the pneumatic circuit according to the present invention.

FIG. 8 is a schematic diagram of the sensing devices used to control the operation of the linear pallet stop.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

General

Referring to FIGS. 1–4, a linear pallet stop 1 is illustrated that includes the present invention. The linear pallet stop 1 is particularly useful for controlling the motions of a workpiece-carrying pallet 3 that is propelled in a downstream direction 5, but it will be understood that the invention is not limited to manufacturing applications.

The linear pallet stop 1 is mounted to a stationary frame member 7 of a conveyance system, not shown, that propels the pallet 3 in the downstream direction 5. The conveyance system may be of any design that suits the particular processing system that acts on the workpiece. Such conveyance systems are well known in the art, and they form no part of the present invention.

Mechanical

The linear pallet stop 1 comprises a plate 9 that is joined to the conveyance system frame member 7 by any suitable means, such as fasteners not illustrated in the drawings. The plate 9 has an upstream end 11 and a downstream end 13. Fastened to the plate at its downstream end 13, as by screws 14, is a fluid cylinder 15. The fluid cylinder 15 has a longitudinal centerline 17 parallel to the pallet downstream direction 5 and a rod 19 that points in the upstream direction. Near the plate upstream end 11 on opposite sides of and parallel to the cylinder centerline 17 are a pair of ways 21. The ways 21 are fastened to the plate by cap screws 23. The upstream ends 25 of the ways are located at accurately controlled locations relative to the conveyance system frame member 7.

Connected to the end of the rod 19 of the fluid cylinder 15 is a slide 27. The slide 27 is preferably U-shaped, having a center leg 29 and two side legs 33. The cylinder rod is connected by the rod end 31, to the slide center leg 29. The slide second legs 33 rest on associated ways 21. Extending between the slide side legs 33 is a pin 35. A slide bearing 37 is rotatably mounted on the pin 35 between the slide side legs. The periphery of the slide bearing 37 projects above and beyond the upstream end of the slide.

The linear pallet stop 1 further comprises a pair of housings 39. The housings 39 are at the upstream end 11 of the plate 9 and outside of the ways 21. Each housing includes a lower block 41 having a top surface 43 and an upper block 45 having a bottom surface 47. A three-sided slot 49 is formed in each upper block 45. The slot 49 opens from the block bottom surface 47. When an upper block is placed on a lower block 41, the lower block top surface 43 forms a fourth side for the slot 49. The blocks are mounted to each other and to the plate 9 by cap screws 51 such that the slots extend in directions parallel to the downstream direction 5 of the pallet 3.

A catch arm 53 has opposed first and second longitudinally extending edges 55 and 57, respectively, opposed side edges 59, and first and second ends 63 and 65, respectively. The junction of the first edge 55 and the first end 63 is formed with a hook 67. The second end 65 of the catch arm 53 has a lug 69 with a stop surface 71 thereon. The catch arm second longitudinal edge 57 defines an arcuate recess 73 near the second end 65. The radius of the arcuate recess 73 is the same as the radius of the slide bearing 37. Assembled in each of the catch arm side edges 59 is a cam follower 75. The cam followers 75 are captured and roll within associated slots 49 of the housings 39. Accordingly, the catch arm 53 is capable of rotating relative to the housings and also of translating in directions parallel to the direction 5 of the pallet 3.

Operation

To control the motion of the pallet 3, the linear pallet stop 1 operates between three positions. FIGS. 1–4 show the linear pallet stop in a ready position. When the linear pallet stop is in the ready position, the catch arm hook 67 is in the path of the pallet as the pallet is propelled in the downstream direction 5 by the conveyance system. At the ready position, the rod 19 of the fluid cylinder 15 is fully extended. The slide bearing 37 is received in the catch arm arcuate recess 73, and the cam followers 75 are at the upstream ends 76 of their respective slots 49 in the housings 39. The catch arm edges 55 and 57 preferably make an angle of approximately 40 to 45 degrees with the fluid cylinder centerline 17.

Now looking at FIG. 5, the linear pallet stop 1 is shown at a stopped position. That position is reached after the pallet 3 has contacted the hook 67 of the catch arm 53 and the momentum of the moving pallet has been transferred to the linear pallet stop. The momentum of the pallet on the catch arm hook tends to rotate the catch arm about the cam followers 75. However, the slide bearing 37 and the slots 49 of the housings 39 set up reaction forces on the catch arm arcuate recess 73 and the cam followers 75, respectively, that prevent any rotation of the catch arm. Consequently, the momentum of the pallet produces only translation of the catch arm in the downstream direction 5, and the cam followers roll in the downstream direction within their associated housing slots. The downstream translation of the catch arm causes similar translation of the slide 27 and the rod 19 of the fluid cylinder 15. That translation is resisted and controlled by a fluid circuit 82 (FIG. 7), to be explained presently, so as to decelerate the pallet.

The downstream translation and deceleration of the pallet 3, catch arm 53, and slide 27 continue until the catch arm stop surface 71 gently strikes the upstream ends 25 of the ways 21. At that point, the pallet is at a desired location relative to the conveyance system, and no further downstream translation of the catch arm or the pallet is possible. The linear pallet stop is then at a stopped position, with the cam followers 75 being near the downstream ends 81 of the housing slots 49.

The pallet 3 will remain at the desired stopped location as long as the linear pallet system 1 remains in its stopped position. During that time, various operations can be performed on the workpiece carried by the pallet that suit the particular application at hand.

When it is desired to release the pallet 3 from the linear pallet stop 1 and thereby enable the conveyance system to propel the pallet further downstream, the linear pallet stop operates to a clearance position, FIG. 6. For that purpose, the rod 19 of the fluid cylinder 15 retracts to pull the slide 27 and slide bearing 37 away from the arcuate recess 73 of the catch arm 53. That action causes the catch arm to rotate in a clockwise direction with respect to FIG. 6 about the cam followers 75, with the catch arm second edge 57 being in support contact with the slide bearing. As the cylinder rod retracts further, the slide bearing rolls along the catch arm toward its first end 63, thereby allowing the catch arm to rotate further clockwise. Ultimately, the rod has retracted and the catch arm has rotated to a position whereat the hook 67 is below the path of the pallet 3. The linear pallet stop is then in the clearance position of FIG. 6, and the conveyance system can propel the pallet 3 further downstream in the direction of arrow 5.

After the pallet 3 has passed over the linear pallet stop 1, the fluid cylinder 15 operates to extend the rod 19. Doing so causes the slide bearing 37 to push against the catch arm 53 and urge it in the upstream direction, that is, to the left with respect to FIG. 6. Consequently, the cam followers 75 roll in the slots 49 of the housings 39 from the slots' downstream ends 81 until the cam followers accost the slots' upstream ends 76. Continued extension of the rod causes the slide bearing to roll along the catch arm second edge 57 toward the catch arm second end 65, thereby causing the catch arm to rotate counterclockwise with respect to FIG. 6 about the cam followers. Extension of the cylinder rod and counterclockwise rotation of the catch arm continues until the slide bearing reenters the catch arm arcuate recess 73. At that point, the linear pallet stop is again in the ready position of FIGS. 1–4.

For safety purposes, a detent 79 is installed in each housing 39. The detents 79 are designed to bias the cam followers 75 near the downstream ends 81 of the housing slots 49. Should an abnormal situation occur after the pallet 3 contacts the catch arm 53 such that the linear pallet stop 1 does not decelerate the pallet, the catch arm stop surface 71 would strike the ways 21 with a relatively high speed. The catch arm second end 65 could conceivably bounce back in the upstream direction, and the catch arm could then rotate to a position that would release the pallet for continued downstream propulsion. The detents 79 prevent the cam followers, and thus the entire second end 65 of the catch arm, from bouncing back. Consequently, the linear pallet stop will safely retain the pallet at its stopped location even under abnormal circumstances.

Control

To control the operation of the linear pallet stop 1, the circuit 82 is employed, FIG. 7. In the preferred embodiment, the circuit 82 and the fluid cylinder 15 are pneumatic. Consequently, the circuit 82 is depicted as being a pneumatic circuit. The pneumatic circuit 82 includes flow control valves 83 and 85 that are installed in the extension and retraction lines 87 and 89, respectively, for the cylinder. The lines 87 and 89 lead to a three-position four-way solenoid valve 91. Air is supplied to the solenoid valve 91 through an inlet line 97 in which are installed a shut-off valve 99, filter 101, and pressure regulator 103. A muffler 93 and a meter-out flow control valve 95 are also part of the pneumatic circuit. The foregoing components of the pneumatic circuit may be entirely conventional and are well known to persons skilled in the art.

FIG. 8 shows additional control components that act in cooperation with the pneumatic circuit 82 to control the linear pallet stop 1. In FIG. 8, reference numerals 105, 107, and 109 indicate sensors, such as proximity switches, that detect the absence or presence of a nearby object. The sensors 105, 107, and 109 are electrically connected to the solenoid valve 91 by a suitable electrical circuit.

The sensor 105 senses the approach of a pallet 3 to a work station or similar location at which the pallet is to be stopped by the linear pallet stop 1. When the sensor 105 senses the pallet 3, it signals the solenoid valve 91 of the pneumatic circuit 82 to shift to the ready position; that is, the solenoid valve shifts to direct air from the inlet line 97 to the extension line 89, through the flow control valve 83, and to the pneumatic cylinder 15. As a result, the cylinder operates to extend the rod 19 and place the linear pallet stop in the ready position of FIGS. 1–4.

The proximity switch 107 senses the pallet 3 just before it contacts the catch arm 53 of the linear pallet stop 1. Upon sensing the approaching pallet, the proximity switch 107 signals the solenoid valve 91 to deenergize both solenoids such that the solenoid valve is in the normal position shown in FIG. 7. In that situation, when the pallet 3 contacts the catch arm 53 and forces it in the downstream direction 5 due to the pallet momentum, air in the cylinder 15 is forced through the extension line 89 and out the meter-out flow control valve 95. The meter-out flow control valve 95 is adjustable to provide desired deceleration for the particular pallet. The meter-out flow control valve controls downstream motion and deceleration of the pallet and catch arm such that the catch arm stop surface 71 gently strikes the upstream ends 25 of the ways 21 without bounce back.

Proximity switch 109 senses that the pallet 3 has indeed properly stopped at the work station or other desired location. The solenoid valve 91 remains at its normal condition as long as the pallet is to remain at its stopped location.

When it is desired to release the pallet for further propulsion in the downstream direction 5 by the conveyance system, the electrical circuit is energized through either known manual or automatic means to shift the solenoid valve 91 to enable air under pressure to flow through the retraction line 87, thereby retracting the rod 19 of the pneumatic cylinder 15. That action causes the linear pallet stop 1 to attain the clearance position of FIG. 6. When the catch arm 53 is in the clearance position, the conveyance system can propel the pallet downstream. Upon sensing the approach of another pallet 3 by the proximity switch 105, that switch signals the solenoid valve 91 to shift such that air under pressure flows through the extension line 89 to again extend the rod 19 and place the linear pallet stop back in the ready position, and the cycle is repeated.

In summary, the results and advantages of workpiece conveyance systems can now be more fully realized. The linear pallet stop 1 provides a smooth deceleration and accurate stopping of a heavy workpiece and pallet and also a release for further motion of the workpiece and pallet. That desirable result comes from using the combined functions of the pneumatic circuit 82 and the catch arm 53. The pneumatic circuit actuates the cylinder 15 to position the catch arm at a ready position ready to be contacted by the pallet. After contact, the catch arm translates under the deceleration control of the cylinder 15 and its circuit 82 to a stopped position. The circuit further actuates the cylinder and catch arm to release the pallet for continued downstream motion, after which the linear pallet stop returns to the ready position.

It will also be recognized that in addition to the superior performance of the linear pallet stop 1, its construction is such as to significantly reduce the cost of manufacture as compared with traditional pallet stop systems. Also, since hydraulic shock absorbers are eliminated, the need for maintenance of the linear pallet stop of the invention is substantially reduced compared with prior stop systems.

Thus, it is apparent that there has been provided, in accordance with the invention, a linear pallet stop that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. In combination with a conveyance system that propels a pallet in a downstream direction along a path, an apparatus for decelerating and stopping the pallet comprising:

a catch arm having first and second ends;

a cam follower connected to the catch arm to enable the catch arm second end to translate in upstream and downstream directions and to enable the catch arm to rotate about its second end;

a slide bearing adapted to slidably engage the catch arm intermediate the first and second ends to support the catch arm between the first and second ends thereof;

a strike surface located at a predetermined location relative to the conveyance system for being struck by the catch arm second end; and an actuator connected to the slide bearing, the actuator forcing the slide bearing to an engagement position that pivots the catch arm into the path of the pallet, the actuator biasing the slide bearing and catch arm against downstream movement of the pallet, with the slide bearing providing resistance to rotation of the catch arm.

2. The combination as recited in claim 1, wherein:

the catch arm is fabricated with a hook on the first end thereof that lies in the path of the pallet when the slide bearing is in the engagement position;

the catch arm second end is fabricated with a stop surface thereon; and the catch arm stop surface is disposed to strike the strike surface after the pallet has contacted the catch arm hook and has translated the catch arm in the downstream direction against the resistance provided by the actuator.

3. The combination as recited in claim 1, wherein the cam follower comprises a pair of cam followers assembled to the catch arm proximate the second end thereof.

4. The combination as recited in claim 3, further comprising a housing to guide the cam followers as they translate in upstream and downstream directions.

5. The combination as recited in claim 1, wherein the slide bearing comprises:

a slide member connected to the actuator; and a slidable bearing mounted to the slide member and disposed in supporting contact with the catch arm between the first and second ends thereof, the slidable bearing cooperating with the cam follower to translate and rotate the catch arm first end into the path of the pallet when the actuator operates the slide bearing to an extended position and to rotate the catch arm first end out of the path of the pallet when the actuator operates the slide bearing to a retracted position.

6. The combination as recited in claim 1, wherein the actuator comprises:

a single fluid cylinder connected to the slide bearing; and a fluid circuit connected to the fluid cylinder to move the slide bearing to an extended position, and to control the fluid cylinder to decelerate the pallet after the pallet has contacted the catch arm and translated it in the downstream direction.

7. The combination as recited in claim 4 wherein:

the housing includes a pair of housings, each housing defining a slot that guides an associated cam follower, each slot having upstream and downstream ends; and wherein the slide bearing includes:

a slide member connected to the actuator; and a slidable bearing mounted to the slide member, the slidable bearing being in supporting contact with the catch arm between the first and second ends thereof, the slidable bearing being slidable along the catch arm to selectively move the catch arm into the path of the pallet.

8. A method of decelerating and stopping an object moving along a conveyor path in a downstream direction, the method comprising the steps of:

pivoting a catch arm, having first and second ends, into a first position where the first end thereof is in the path of the object;

contacting the object with the catch arm first end;

translating the catch arm in the downstream direction and simultaneously decelerating the downstream translation of the object and the catch arm without substantially pivoting the catch arm by applying a controlled force in the upstream direction by an actuator;

stopping the downstream translation of the object and the catch arm at a predetermined location along the path, wherein the catch arm is at a second position; and pivoting the catch arm to a third position out of the path of the object by applying a controlled force in the downstream direction by the same actuator.

9. The method as recited in claim 8, wherein the the catch arm pivots about a cam follower located proximate the second end thereof.

10. The method as recited in claim 9, wherein the step of pivoting the catch arm into the first position comprises the steps of:

pushing the catch arm in an upstream direction and simultaneously translating the cam follower in the upstream direction;

stopping the upstream translation of the cam follower at a predetermined location; and rotating the catch arm about the cam follower and placing the catch arm first end in the path of the object.

11. The method as recited in claim 10, wherein the step of pushing the catch arm comprises the steps of:

operating a fluid cylinder having a rod connected to a slide to push the catch arm in the upstream direction with the slide.

12. The method as recited in claim 11, wherein the step of translating the catch arm in the downstream direction and simultaneously decelerating the downstream translation of the object and the catch arm comprises the steps of:

coupling the downstream force of the catch arm to the slide and to the fluid cylinder rod; and controlling the flow of fluid within the fluid cylinder to resist the downstream force of the slide by the catch arm.

13. The method as recited in claim 12, wherein the step of controlling the flow of the fluid within the fluid cylinder comprises the step of metering the flow of fluid from the fluid cylinder to gently stop the downstream translation of the object and catch arm at the predetermined location without bounceback.

14. An apparatus for decelerating an object moving along a path in a downstream direction, the apparatus comprising:

a base;

a catch arm coupled to the base, the catch arm being adapted to engage the object when the catch arm is in a first orientation and to disengage from the object when the catch arm is in a second orientation; and a single controllable actuator means for:
(a) applying a decelerating force to the catch arm against the downstream movement of the object when the catch arm is in the first orientation and
(b) controlling the movement of the catch arm between the first and second orientations.

15. The apparatus as recited in claim 14, wherein the base includes a housing, wherein the catch arm is connected to the housing at a pivot point such that the catch arm rotates about the pivot point between the first and second orientations.

16. The apparatus as recited in claim 15, wherein the housing includes a slot disposed substantially parallel to the path, and wherein the pivot point of the catch arm moves linearly within the slot when the catch arm is in the first orientation while the object is decelerating.

17. The apparatus as recited in claim 16, wherein the actuator means includes a single fluid cylinder coupled to a fluid circuit, wherein the fluid circuit controls the amount of decelerating force which the catch arm applies against the object.

18. The apparatus as recited in claim 15, wherein the actuator means includes a cam follower adapted to at least partially support the catch arm when the catch arm rotates about the pivot point between the first and second orientations.

19. The apparatus as recited in claim 18, wherein the actuator means includes a single fluid cylinder coupled to a fluid circuit, wherein the fluid circuit controls the movement of the cam follower to move the catch arm between the first and second orientations.

20. The apparatus as recited in claim 14, wherein the object is a pallet moving along a conveyor system.

* * * * *